Oct. 27, 1931.  E. MESSER  1,829,568

PROCESS OF MAKING EDIBLE BAR BRITTLES

Filed Jan. 25, 1930

INVENTOR.
Edward Messer
BY James V. Ramsey
ATTORNEY.

Patented Oct. 27, 1931

1,829,568

UNITED STATES PATENT OFFICE

EDWARD MESSER, OF CINCINNATI, OHIO

PROCESS OF MAKING EDIBLE BAR BRITTLES

Application filed January 25, 1930. Serial No. 423,477.

My invention relates to novel chocolate candy and nut bars and to the process of making the same.

The object of my invention is to produce, in the form of bars, a palatable, fragile, edible product composed of a mixture of chocolate candy and hard candy flakes, either with or without broken nuts, and which has a consistency that readily yields (when being masticated) to the action of the teeth, said product being sufficiently firm to retain its shape when being handled and at the same time sufficiently fragile to be easily broken into blocks or units of the desired size for eating.

My invention consists of an article of manufacture comprising bar brittles formed of a mixture of chocolate candy and hard candy flakes, either with or without broken nuts, and it further consists in the process of making the same, as herein set forth and claimed.

Figure 1:
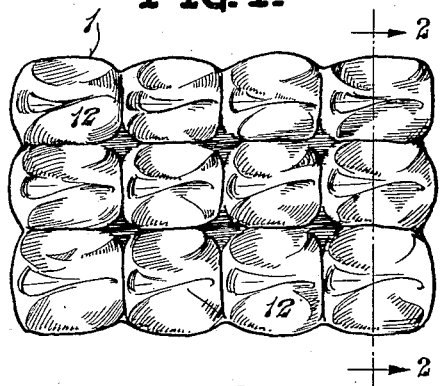
Fig. 1 is a plan view of a bar or cake of my edible chocolate candy bar showing it composed of easily separable blocks or units.
Figure 2:
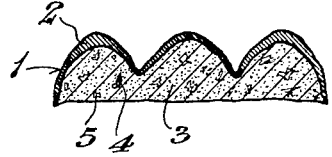
Fig. 2 is a vertical cross section of the bar taken on a plane corresponding to line 2—2 of Fig. 1.
Figure 3:
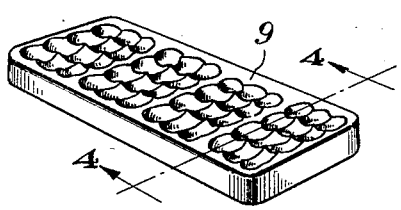
Fig. 3 is a perspective view of a mold used to form the bar shown in Fig. 1.
Figure 4:
Fig. 4 is a vertical cross section of the mold taken on a plane corresponding to line 4—4 of Fig. 3.
Figure 6:
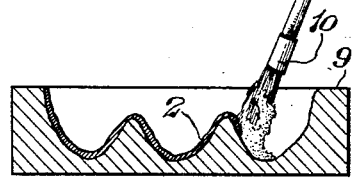
Fig. 6 is a cross sectional view of the mold similar to Fig. 4, showing the method in which the outside layer of chocolate is applied.

In the preferred embodiment of my invention as illustrated, candy bar or cake 1 comprises an upper layer, shell or coating 2 of chocolate candy within which is contained a body 3 of like chocolate candy having embedded therein chips or flakes 4 of hard flinty brittle candy, either with or without nut fragments 5.

The preferred method of making these candy bars or cakes is as follows—

Figure 5:
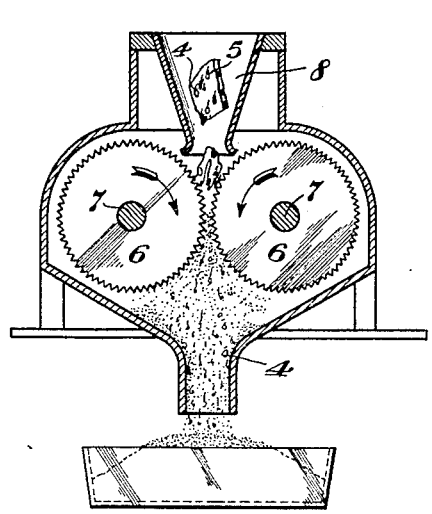
Fig. 5 is a central vertical cross section of the machine used for sawing or breaking the hard candy into small flakes or chips.
Figure 7:
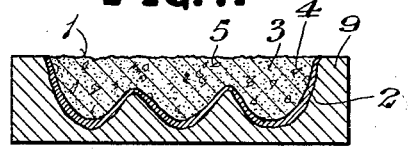
Fig. 7 is a similar view after the chocolate and hard candy mixture is filled within the mold.

Boil a batch of hard candy containing sugar and corn syrup, either with or without nuts. When cooked to the proper consistency, spread thin on a cooling slab and allow it to cool and harden. After it is set and crisp, it is broken into small flakes or chips with circular saws 6, as shown in Fig. 5. These saws are arranged opposite each other on shafts 7 and several saws may be thus mounted in slightly spaced apart relation on each shaft. As the hard candy is passed through the hopper 8 between these saws, it is ripped apart, making chips or flakes 4 of candy and not fine powder.

The mold 9, preferably of the shape shown, but which may be of any other desired shape, is painted or coated on its inner surfaces by a brush 10 (or otherwise) with a layer 2 of chocolate candy liquid. The flakes or chips 4 of hard candy or of hard candy and nut fragments 5, as the case may be, are then mixed with and embedded in warm chocolate candy liquid of heavy consistency and filled into the mold upon the coating layer and levelled off to the desired thickness, thus forming the body 3 of the bar. The mold thus filled is then put into a cold box (or other cold place) and when the chocolate is cooled and firmly set the bars are readily released therefrom by tapping one edge of the mold upon a table or by tapping upon the back of the mold.

The object of painting or coating the interior of the mold with chocolate is to give the top of the finished candy bar a neater appearance and smooth finish and to prevent any of the flakes or chips of hard candy from being exposed on the top or side surfaces of the bar.

Chocolate candies have heretofore consisted of pieces of soft chocolate candy or soft chocolate candy containing other soft candy embedded therein, but they melt too quickly in the mouth and do not provide satisfactory resistance to the action of the teeth. Hard candy has also been made with whole nuts embedded therein but without being formed into small flakes or chips and mixed with chocolate liquid with a top coating of chocolate thereover. The hard candy, either with or without nuts, as heretofore produced, is not easy to masticate and under the action of the teeth produces a crunch or grinding noise which is objectionable and requires considerable force or pressure of the teeth thereon in chewing it and also entails the danger of breaking the teeth.

But when the bars are made in accordance with my invention, with the hard candy or candy and nuts broken into flakes or chips and mixed with the soft, pliable, yielding chocolate, it produces a bar containing squares or blocks 12 which are easily broken therefrom and by reason of their consistency of small hard flinty particles embedded in the soft yielding chocolate the eating of the candy is relieved from the foregoing objections and becomes very pleasant and agreeable.

It has the further advantage of combining the flavors and producing a much more palatable edible product than where the ingredients are used separately or in the other combinations heretofore employed.

If the chips or flakes of hard candy were exposed to the air for a considerable time they would become sticky and "runny" to such an extent as to form a solid mass, but by embedding said chips or flakes of hard candy in soft chocolate candy they are protected from the air and moisture and sufficiently separated from one another within the chocolate bar to retain the hard flinty brittle consistency which is a desirable feature of my invention. In other words, my candy bar is so formed that each of its ingredients retains its original characterstics until used and the combination of hard, flinty particles in spaced apart relation within the body of the soft chocolate portion, produces just that combination of elements which is most desirable and when being eaten will not so quickly and readily melt in the mouth but each block will afford a much longer period of palatable mastication than otherwise.

My novel candy bars are preferably made rectangular in shape with intersecting creases partly separating the bars into units or blocks 12, as shown. They are thus readily separable from each other for convenience in eating them one at a time.

What I claim as new and desire to secure by Letters Patent is:

1. The herein described process which consists in placing a layer of warm chocolate upon a mold, mixing together warm chocolate and hard candy flakes, then placing said mixture in said mold upon said layer of chocolate, then cooling said mixture and then removing it from the mold whereby a fragile edible product is produced.

2. The herein described process which consists in placing a layer of warm chocolate candy upon a mold, mixing together warm chocolate candy liquid and flakes or brittles of hard flinty candy and broken nuts, then placing said mixture in said mold upon said layer of chocolate candy, then cooling said ingredients and then removing it from the mold.

3. The herein described process which consists in placing a layer of warm chocolate candy of the consistency of heavy syrup upon a mold, immersing hard candy flakes in warm chocolate candy syrup, then placing said mixture in said mold upon said layer of chocolate candy syrup, then cooling said mixture and then removing it from the mold whereby a fragile, edible product is produced.

4. The herein described process of producing an edible candy bar which consists in painting a mold of any desired shape with heavy liquid chocolate candy, then filling said mold with liquid chocolate candy having chips or flakes of hard candy embedded therein, then cooling said mold and mixture to complete the finished cake.

5. The herein described process of producing an edible candy bar which consists in forming hard candy, with or without nuts, then breaking said hard candy into small chips or flakes, then mixing said chips or flakes of hard candy with heavy liquid chocolate, then painting a mold of any desired shape with melted chocolate candy, then placing the mixture of liquid chocolate and chips and flakes of hard candy within said mold, then cooling said mixture and mold whereupon the bar of candy may be readily released therefrom.

EDWARD MESSER.